US012613392B2

(12) United States Patent
Kang et al.

(10) Patent No.: US 12,613,392 B2
(45) Date of Patent: Apr. 28, 2026

(54) LENS MODULE

(71) Applicant: SAMSUNG ELECTRO-MECHANICS CO., LTD., Suwon-si (KR)

(72) Inventors: Sung Ho Kang, Suwon-si (KR); Jae Man Park, Suwon-si (KR); Jae Kyung Kim, Suwon-si (KR); Sung Hoon Kim, Suwon-si (KR); Sung Hae Lee, Suwon-si (KR); Sung Taek Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 890 days.

(21) Appl. No.: 17/716,063

(22) Filed: Apr. 8, 2022

(65) Prior Publication Data

US 2023/0204897 A1     Jun. 29, 2023

(30) Foreign Application Priority Data

Dec. 23, 2021     (KR) ......................... 10-2021-0186209

(51) Int. Cl.
*G02B 7/02* (2021.01)
(52) U.S. Cl.
CPC ............. *G02B 7/026* (2013.01); *G02B 7/021* (2013.01)

(58) Field of Classification Search
CPC .... G03B 17/12–14; G02B 7/02; G02B 7/022; G02B 7/026; H04N 23/55
See application file for complete search history.

(56) References Cited

U.S. PATENT DOCUMENTS

| | | | |
|---|---|---|---|
| 2004/0042092 A1* | 3/2004 | Nomura ................. | G02B 7/102 |
| | | | 359/819 |
| 2006/0193064 A1* | 8/2006 | Kim ......................... | G02B 3/12 |
| | | | 359/811 |
| 2010/0226023 A1 | 9/2010 | Lee | |
| 2022/0236511 A1* | 7/2022 | Wu ......................... | G02B 7/023 |

FOREIGN PATENT DOCUMENTS

| | | | | |
|---|---|---|---|---|
| JP | 2019-219665 A | 12/2019 | | |
| KR | 10-2010-0099560 A | 9/2010 | | |
| KR | 10-2010-0113733 A | 10/2010 | | |
| KR | 10-2017-0000313 A | 1/2017 | | |
| KR | 20170000313 A | * | 1/2017 | .............. G02B 3/10 |
| TW | I509285 B | * | 1/2001 | |

* cited by examiner

*Primary Examiner* — Balram T Parbadia
*Assistant Examiner* — Samanvitha Sridhar
(74) *Attorney, Agent, or Firm* — NSIP Law

(57) ABSTRACT

A lens module includes a lens barrel in which a plurality of lenses are disposed, and a lens holder to which the lens barrel is coupled, wherein the lens holder includes a fastening portion fastening the lens barrel, the lens barrel includes a fastening blade coupled to the fastening portion of the lens holder, and the fastening portion includes a stepped portion preventing rotation in a direction, opposite to a direction in which the fastening blade rotates for fastening.

13 Claims, 7 Drawing Sheets

LENS MODULE

CROSS-REFERENCE TO RELATED APPLICATIONS

This application claims the benefit under 35 USC 119(a) of Korean Patent Application No. 10-2021-0186209 filed on Dec. 23, 2021, in the Korean Intellectual Property Office, the entire disclosure of which is incorporated herein by reference for all purposes.

BACKGROUND

1. Field

The present disclosure relates to a lens module.

2. Description of the Background

A process of manufacturing a camera module may proceed in a state in which a plurality of lenses are fastened to a lens barrel. Accordingly, there may be a problem in that a lens may be loosened during movement in assembly equipment and between operations of the process. In particular, in a non-contact fastening manner, there may be a problem affecting yield and performance. In order to solve such a problem, it is necessary to develop an assembly structure preventing fastening and loosening of a lens in advance.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens module includes a lens barrel in which a plurality of lenses are disposed, and a lens holder to which the lens barrel is coupled, wherein the lens holder includes a fastening portion fastening the lens barrel, the lens barrel includes a fastening blade coupled to the fastening portion of the lens holder, and the fastening portion includes a stepped portion preventing rotation in a direction, opposite to a direction in which the fastening blade rotates for fastening.

The fastening portion may include an upper fastening protrusion preventing movement toward an upper side of the fastening blade, and a lower fastening protrusion limiting movement of the fastening blade in a circumferential direction, and the stepped portion may be provided on the lower fastening protrusion.

The upper fastening protrusion and the lower fastening protrusion may be arranged to be spaced apart from each other, and the fastening blade may be inserted between the upper fastening protrusion and the lower fastening protrusion.

The fastening blade may include a protrusion portion regulating a range of movement toward the upper fastening protrusion.

An upper surface of the fastening blade disposed on one side of the protrusion portion may be constrained by the upper fastening protrusion of the lens holder, and a side surface of the fastening blade disposed on an other side of the protrusion portion may be constrained by the stepped portion of the lower fastening protrusion of the lens holder.

A thickness of a region of the fastening blade, excluding a region of the fastening blade on which the protrusion portion is disposed is less than a distance of a space between the upper fastening protrusion and the lower fastening protrusion in an optical axis direction.

When assembling the lens barrel and the lens holder, the fastening blade may be movable in the space between the upper fastening protrusion and the lower fastening protrusion in the optical axis and circumferential directions.

The upper fastening protrusion may include a locking protrusion regulating movement toward an upper side of the fastening blade, and the lower fastening protrusion may include a support portion regulating movement toward a lower side of the fastening blade.

A distance between a portion of the upper fastening protrusion disposed on a lower portion of the locking protrusion and the support portion of the lower fastening protrusion in the circumferential direction may be shorter than a length of the fastening blade in the circumferential direction.

The support portion may include a fixing protrusion temporarily fixing the fastening blade.

The fixing protrusion may be provided as a plurality of fixing protrusions, and the plurality of fixing protrusions may be spaced apart from each other.

A groove into which the fixing protrusion may be inserted may be provided in a bottom surface of the fastening blade.

The fastening blade may be formed to extend from a light-shielding band portion protruding from an outer surface of the lens barrel.

In another general aspect, a lens module includes a lens barrel in which a plurality of lenses are disposed, and a lens holder to which the lens barrel is coupled, wherein the lens holder includes an upper fastening protrusion fastening the lens barrel, and a lower fastening protrusion spaced apart from the upper fastening protrusion and forming a space between the upper fastening protrusion, the lens barrel includes a fastening blade to be inserted into the space between the upper fastening protrusion and the lower fastening protrusion, and the lower fastening protrusion includes a stepped portion restricting movement of the fastening blade in a direction, opposite to a direction in which the fastening blade is fastened.

In another general aspect, a lens module includes a lens barrel having a fastening blade, and a lens holder having a fastening portion, wherein the fastening portion includes a stepped portion, and wherein the fastening blade is rotatably advanced into the fastening portion and the stepped portion limits reverse rotation of the blade.

The fastening blade disposed in the fastening portion may be movable in an optical axis direction and rotatable in a circumferential direction.

The fastening portion may include an upper fastening protrusion, and the fastening blade movement may be limited in an optical axis direction by the upper fastening protrusion and limited in a circumferential direction by the upper fastening protrusion in an advance direction and the stepped portion in a reverse direction.

The upper fastening protrusion may include a locking protrusion, the fastening blade may include a protrusion portion, and the fastening blade movement may be limited in the advance direction by the locking protrusion contacting the protrusion portion.

The fastening portion may include a lower fastening protrusion spaced apart from the upper fastening protrusion, the lower fastening protrusion may limit movement of the fastening blade in the optical axis direction, and the stepped portion may be disposed on the lower fastening protrusion.

The lens barrel may be fixed to the lens holder by an adhesive.

The lens barrel may be tilted relative to the lens holder.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
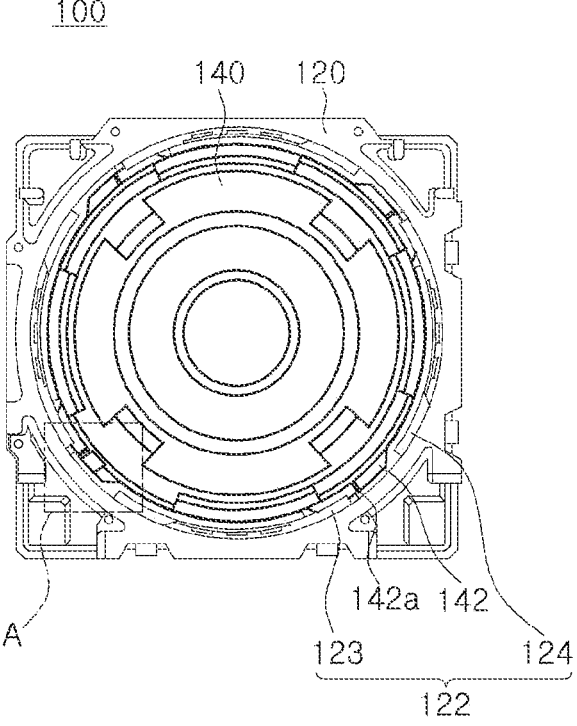
FIG. 1 is a plan view illustrating a lens module according to an embodiment of the present disclosure.

Hereinafter, while example embodiments of the present disclosure will now be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide a lens module preventing loosening of a lens after the lens is fastened.

Figure 2:
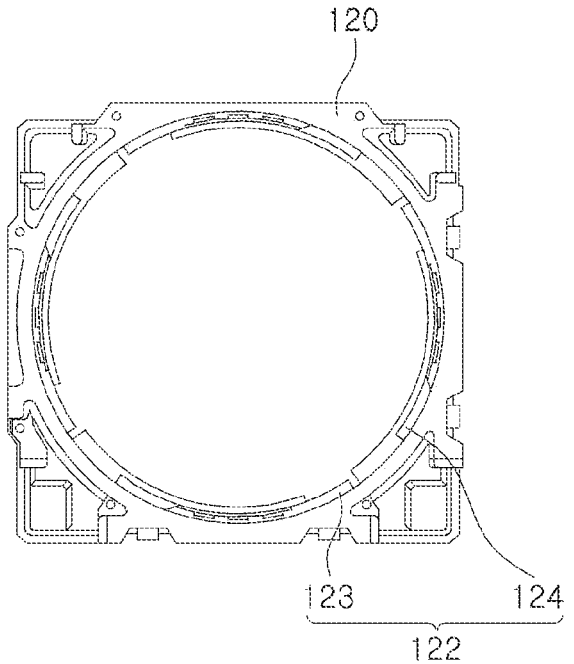
FIG. 2 is a plan view illustrating a lens holder of a lens module according to an embodiment of the present disclosure.
Figure 3:
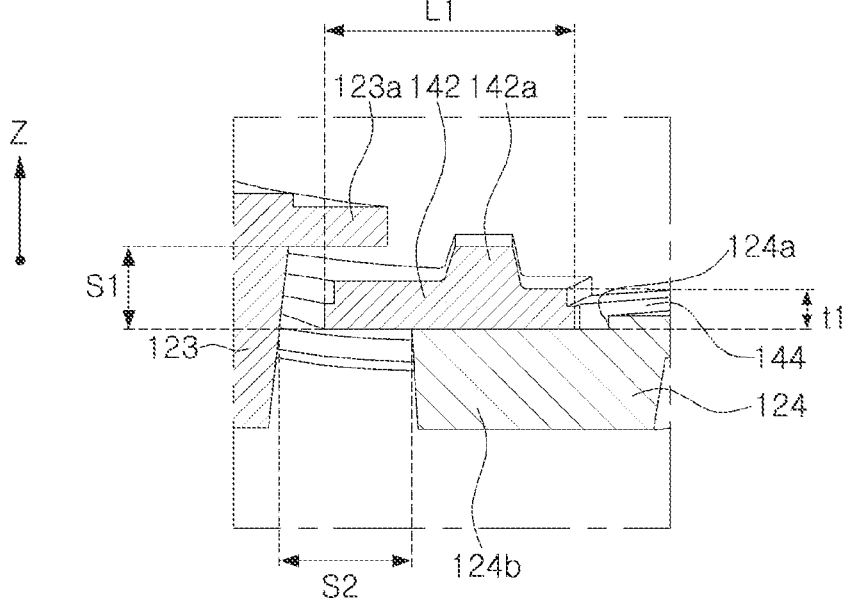
FIG. 3 is an enlarged perspective view illustrating portion A of FIG. 1.

FIG. 1 is a plan view illustrating a lens module according to an embodiment of the present disclosure, FIG. 2 is a plan view illustrating a lens holder of a lens module according to an embodiment of the present disclosure, and FIG. 3 is an enlarged perspective view illustrating portion A of FIG. 1.

Referring to FIGS. 1 to 3, a lens module 100 according to an embodiment of the present disclosure may include, for example, a lens holder 120 and a lens barrel 140.

The lens barrel 140 may be inserted into and coupled to the lens holder 120. As an example, the lens holder 120 may be provided with a fastening portion 122 for fastening the lens barrel 140. The fastening portion 122 may be disposed on an upper end of the lens holder 120, and a plurality of fastening portions 122 may be disposed to be spaced apart from each other in a circumferential direction.

The fastening portion 122 may include an upper fastening protrusion 123 for fastening the lens barrel 140, and a lower fastening protrusion 124 spaced apart from the upper fastening protrusion 123 and forming a space between the upper fastening protrusion 123 and the lower fastening protrusion 124.

As an example, the upper fastening protrusion 123 may include a locking protrusion 123a protruding in a lateral direction. The locking protrusion 123a may serve to prevent movement toward an upper side of a fastening blade 142, which will be described later. A detailed description thereof will be provided later.

In addition, the lower fastening protrusion 124 may include a stepped portion 124a for preventing rotation in a direction, opposite to a direction in which the fastening blade 142 rotates for fastening. The stepped portion 124a may be formed to extend toward the upper fastening protrusion 123 and may be provided on a support portion 124b for regulating movement toward a lower side of the fastening blade 142. For example, the stepped portion 124a may be formed on the support portion 124b.

In this case, when a term for a direction is defined, an optical axis direction may refer to a Z-axis direction of FIG. 3, and a circumferential direction may refer to a direction rotating about the Z-axis direction, for example, along an outer circumferential surface of the lens barrel 140.

A plurality of lenses (not illustrated) may be disposed in the lens barrel 140, and may be assembled to the lens holder 120. The lens barrel 140 may include the fastening blade 142 for coupling to the lens holder 120. The fastening blade 142 may be inserted into the space between the upper fastening protrusion 123 and the lower fastening protrusion 124. When the fastening blade 142 rotates at a predetermined angle to fasten the lens barrel 140 to the lens holder 120 in a state in which the fastening blade 142 is inserted into the space between the upper fastening protrusion 123 and the lower fastening protrusion 124, the fastening blade 142 may be disposed on one side of the stepped portion 124a of the lower fastening protrusion 124. Thereafter, rotation of the lens barrel 140 in a direction, opposite to the rotation direction for fastening, may be prevented by the stepped portion 124a of the lower fastening protrusion 124.

The fastening blade 142 may include a protrusion portion 142a for regulating a range of movement toward the upper fastening protrusion 123. An upper surface of the fastening blade 142 disposed on one side of the protrusion portion 142a may be constrained by a bottom surface of the upper fastening protrusion 123 of the lens holder 120, and a side surface of the fastening blade 142 disposed on the other side of the protrusion portion 142a may be constrained by the stepped portion 124a of the lower fastening protrusion 124 of the lens holder 120.

Since the fastening blade 142 is provided with the protrusion portion 142a, the fastening blade 142 may no longer be rotated by the locking protrusion 123a protruding onto one side of the upper fastening protrusion 123. Therefore, the fastening blade 142 may be disposed between the upper fastening protrusion 123 and the lower fastening protrusion 124.

A thickness t1 of a region of the fastening blade 142, excluding a region of the fastening blade 142 on which the protrusion portion 142a is disposed may be less than a distance S1 of the space between the upper fastening protrusion 123 and the lower fastening protrusion 124 in an optical axis direction. Therefore, the fastening blade 142 may be movable in the space between the upper fastening protrusion 123 and the lower fastening protrusion 124 in the optical axis and circumferential directions.

Therefore, when the lens holder 120 and the lens barrel 140 are fixed with an adhesive, the lens barrel 140 may be fixed to the lens holder 120 while tilting.

A distance S2 between a portion of the upper fastening protrusion 123 disposed on a lower portion of the locking protrusion 123a and the support portion 124b of the lower fastening protrusion 124 in the circumferential direction may be shorter than a length L1 of the fastening blade 142 in the circumferential direction. Therefore, the fastening blade 142 may not move toward a lower side of the lower fastening protrusion 124. Therefore, the fastening blade 142 may maintain in a state in which the fastening blade 142 is safely provided on an upper surface of the support portion 124b.

The fastening blade 142 may be formed to extend from a light-shielding band portion 144 formed to protrude outwardly from an outer surface of the lens barrel 140 in a radial direction. The light-shielding band portion 144 may serve to reduce propagation of light into a space between the lens holder 120 and the lens barrel 140.

As described above, the present disclosure may prevent phenomena of fastening and loosening a lens during a manufacturing process by including the stepped portion 124a for preventing rotation in a direction, opposite to a direction in which the fastening blade 142 rotates for fastening with the lower fastening protrusion 124.

Figure 4:
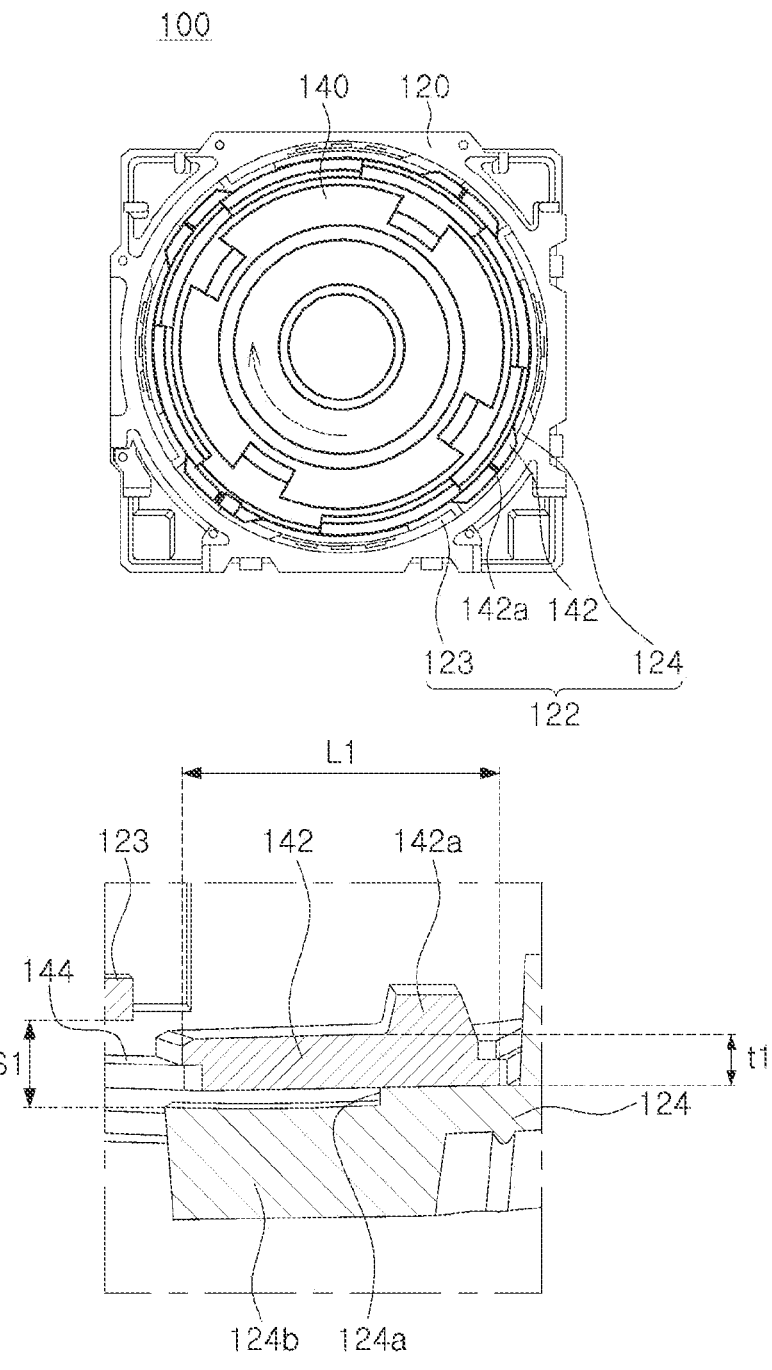
FIG. 4 presents explanatory views illustrating a process of assembling a lens holder of a lens barrel according to an embodiment of the present disclosure.
Figure 5:
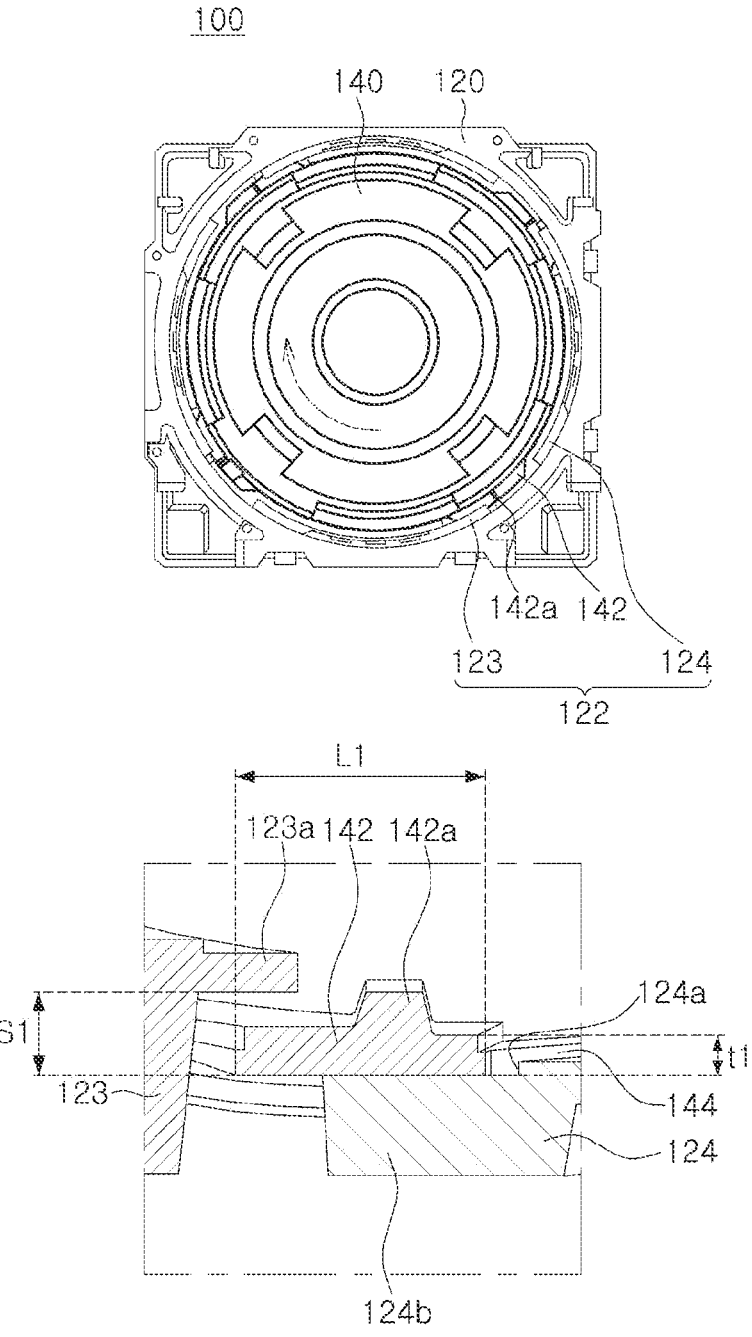
FIG. 5 presents explanatory views illustrating a process of assembling a lens holder of a lens barrel according to an embodiment of the present disclosure.
Figure 6:
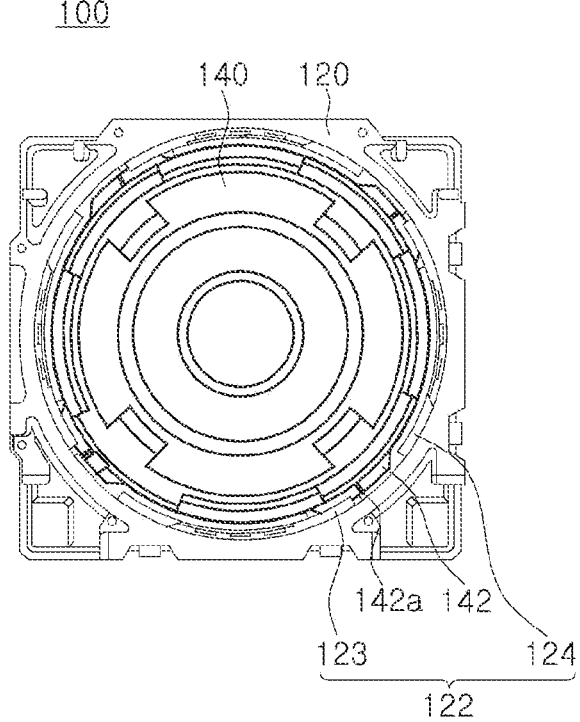
FIG. 6 presents explanatory views illustrating a process of assembling a lens holder of a lens barrel according to an embodiment of the present disclosure.
Figure 6:
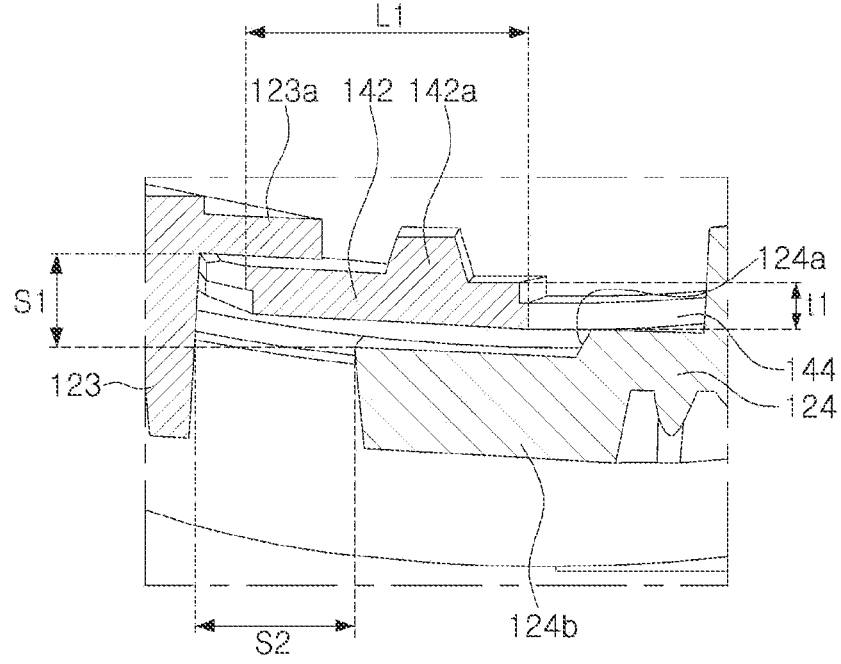

FIGS. 4 to 6 are explanatory views illustrating a process of assembling a lens holder of a lens barrel.

First, as illustrated in FIG. 4, when a lens barrel 140 is temporarily assembled to a lens holder 120, a fastening blade 142 may be configured to be inserted into a space between an upper fastening protrusion 123 and a lower fastening protrusion 124.

Thereafter, when the lens barrel 140 rotates, as illustrated in FIG. 5, the fastening blade 142 may be disposed on a support portion 124b of the lower fastening protrusion 124, and a stepped portion 124a of the lower fastening protrusion 124 may be disposed to be spaced apart from one side of the fastening blade 142. In such a state, when the lens barrel 140 rotates in a reverse direction, a side surface of the fastening blade 142 may be caught by the stepped portion 124a, such that the fastening blade 142 may not rotate any more. Therefore, it is possible to prevent the lens barrel 140 from being loosened and separated from the lens holder 120. Therefore, even when the lens barrel 140 and the lens holder 120 are combined and move in a state in which they are stored in a tray (not illustrated) during a manufacturing process, separation of the lens barrel 140 and the lens holder 120 may be prevented.

As illustrated in FIG. 6, when the lens holder 120 and the lens barrel 140 are to be fixed by bonding, the lens holder 120 and the lens barrel 140 may be fixed by bonding in a state in which the lens barrel 140 is tilted to fix the lens barrel 140 and the lens holder 120.

In this case, since a thickness of a region of the fastening blade 142, excluding a region of the fastening blade 142 on which the protrusion portion 142a is disposed is less than a distance of a space between the upper fastening protrusion 123 and the lower fastening protrusion 124 in an optical axis direction, the fastening blade 142 may be movable in the space between the upper fastening protrusion 123 and the lower fastening protrusion 124 in the optical axis and circumferential directions. Therefore, when the lens holder 120 and the lens barrel 140 are fixed with an adhesive, the lens barrel 140 may be fixed to the lens holder 120 while tilting.

A shape of the fastening blade 142 and the lower fastening protrusion 124 illustrated in FIGS. 4 to 6 is a cross-sectional view of the fastening blade 142 and the lower fastening protrusion 124 to more easily illustrate an assembly process, and cross-sectional views of the fastening blade 142 and the lower fastening protrusion 124 illustrated in FIGS. 4 to 6 illustrate cross-sectional views at different positions. For example, FIG. 4 is a cross-sectional view of a portion of the lower fastening protrusion 124 spaced apart from the light-shielding band portion 144, and FIGS. 5 and 6 are cross-sectional views of portions in which the lower fastening protrusion 124 and the light-shielding band portion 144 overlap.

Figure 7:
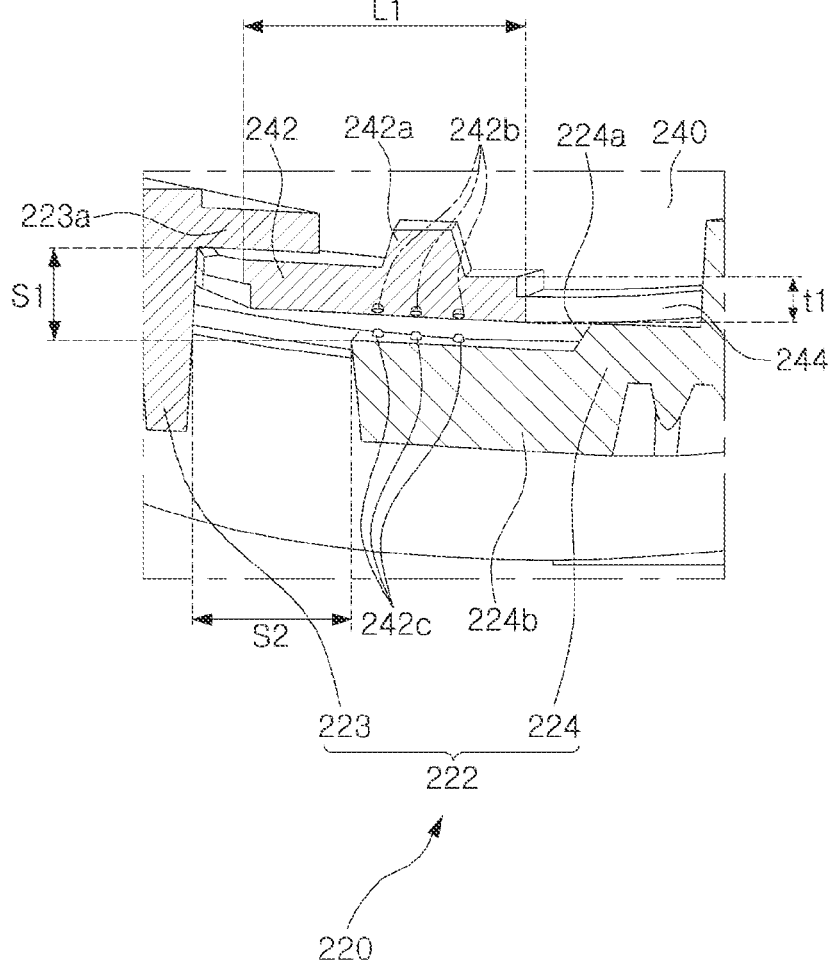
FIG. 7 is an enlarged perspective view illustrating a modified embodiment of portion A of FIG. 1.

FIG. 7 is an enlarged perspective view illustrating a modified embodiment of portion A of FIG. 1.

Referring to FIG. 7, a lens barrel 240 may be inserted into and coupled to a lens holder 220. As an example, the lens holder 220 may be provided with a fastening portion 222 for fastening the lens barrel 240. The fastening portion 222 may be disposed on an upper end of the lens holder 220, and a plurality of fastening portions 222 may be disposed to be spaced apart from each other in a circumferential direction.

The fastening portion 222 may include an upper fastening protrusion 223 for fastening the lens barrel 240, and a lower fastening protrusion 224 spaced apart from the upper fastening protrusion 223 and forming a space between the upper fastening protrusion 223 and the lower fastening protrusion 224.

As an example, the upper fastening protrusion 223 may include a locking protrusion 223a protruding in a lateral direction. The locking protrusion 223a may serve to prevent movement toward an upper side of a fastening blade 242, which will be described later. A detailed description thereof will be provided later.

In addition, the lower fastening protrusion 224 may include a stepped portion 224a for preventing rotation in a direction, opposite to a direction in which the fastening blade 242 rotates for fastening. The stepped portion 224a may be formed to extend toward the upper fastening protrusion 223 and may be provided on a support portion 224b for regulating movement toward a lower side of the fastening blade 242. For example, the stepped portion 224a may be formed on the support portion 224b. A fixing protrusion 242c for temporarily fixing the fastening blade 242 may be provided on an upper surface of the support portion 224b. A plurality of fixing protrusions 242c may be disposed to be spaced apart from each other. In the fixing protrusion 242c, which may be a component for temporarily fixing the fastening blade 242, the fixing protrusion 242c may have a height allowing the fastening blade 242 to be easily rotated by an operator.

The lens barrel 240 may be assembled to the lens holder 220. The lens barrel 240 may include the fastening blade 242 for coupling to the lens holder 220. The fastening blade 242 may be inserted into the space between the upper fastening protrusion 223 and the lower fastening protrusion 224. When the fastening blade 242 rotates at a predetermined angle to fasten the lens barrel 240 to the lens holder 220 in a state in which the fastening blade 242 is inserted into the space between the upper fastening protrusion 223 and the lower fastening protrusion 224, the fastening blade 242 may be disposed on one side of the stepped portion 224a of the lower fastening protrusion 224. Thereafter, rotation of the lens barrel 240 in a direction, opposite to the rotation direction for fastening, may be prevented by the stepped portion 224a of the lower fastening protrusion 224.

The fastening blade 242 may include a protrusion portion 242a for regulating a range of movement toward the upper fastening protrusion 223. An upper surface of the fastening blade 242 disposed on one side of the protrusion portion 242a may be constrained by a bottom surface of the upper fastening protrusion 223 of the lens holder 220, and a side surface of the fastening blade 242 disposed on the other side of the protrusion portion 242a may be constrained by the stepped portion 224a of the lower fastening protrusion 224 of the lens holder 220.

Since the fastening blade 242 is provided with the protrusion portion 242a, the fastening blade 242 may no longer be rotated by the locking protrusion 223a protruding onto one side of the upper fastening protrusion 223. Therefore, the fastening blade 242 may be disposed between the upper fastening protrusion 223 and the lower fastening protrusion 224.

A thickness t1 of a region of the fastening blade 242, excluding a region of the fastening blade 242 on which the protrusion portion 242a is disposed may be less than a distance S1 of the space between the upper fastening protrusion 223 and the lower fastening protrusion 224 in an optical axis direction. Therefore, the fastening blade 242 may be movable in the space between the upper fastening protrusion 223 and the lower fastening protrusion 224 in the optical axis and circumferential directions.

Therefore, when the lens holder 220 and the lens barrel 240 are fixed with an adhesive, the lens barrel 240 may be fixed to the lens holder 220 while tilting.

A distance S2 between a portion of the upper fastening protrusion 223 disposed on a lower portion of the locking protrusion 223a and the support portion 224b of the lower fastening protrusion 224 in the circumferential direction may be shorter than a length L1 of the fastening blade 242 in the circumferential direction. Therefore, the fastening blade 242 may not move toward a lower side of the lower fastening protrusion 224. Therefore, the fastening blade 242 may maintain a state in which the fastening blade 242 is safely provided on an upper surface of the support portion 224b.

A groove 242b into which the fixing protrusion 242c is inserted may be provided in a bottom surface of the fastening blade 242. Therefore, when the fastening blade 242 is safely provided on the support portion 224b, the fastening blade 242 may be temporarily fixed while the fixing protrusion 242c is inserted into the groove 242b.

The fastening blade 242 may be formed to extend from a light-shielding band portion 244 formed to protrude outwardly from an outer surface of the lens barrel 240 in a radial direction. The light-shielding band portion 244 may serve to reduce propagation of light into a space between the lens holder 220 and the lens barrel 240.

According to one or more embodiments of the present disclosure as described herein, there may be an effect of preventing loosening of a lens after the lens is fastened.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
a lens barrel in which a plurality of lenses are disposed; and
a lens holder to which the lens barrel is coupled,
wherein the lens holder comprises a fastening portion fastening the lens barrel,
wherein the lens barrel comprises a fastening blade coupled to the fastening portion of the lens holder,
wherein the lens barrel is configured to rotate in a direction relative to the lens holder to couple the fastening blade to the fastening portion,
wherein the fastening portion comprises an upper fastening protrusion preventing movement toward an upper side of the fastening blade, a lower fastening protrusion limiting movement of the fastening blade in a circumferential direction, and a stepped portion preventing rotation in a direction opposite to the direction in which the fastening blade rotates for fastening,
wherein the stepped portion is disposed on the lower fastening protrusion, and
wherein the stepped portion extends towards the upper fastening protrusion.

2. The lens module of claim 1, wherein the upper fastening protrusion and the lower fastening protrusion are arranged to be spaced apart from each other, and
wherein the fastening blade is inserted between the upper fastening protrusion and the lower fastening protrusion.

3. The lens module of claim 1, wherein the fastening blade comprises a protrusion portion regulating a range of movement toward the upper fastening protrusion.

4. The lens module of claim 3, wherein an upper surface of the fastening blade disposed on one side of the protrusion portion is constrained by the upper fastening protrusion of the lens holder, and
a side surface of the fastening blade disposed on an other side of the protrusion portion is constrained by the stepped portion of the lower fastening protrusion of the lens holder.

5. The lens module of claim 3, wherein a thickness of a region of the fastening blade, excluding a region of the fastening blade on which the protrusion portion is disposed is less than a distance of a space between the upper fastening protrusion and the lower fastening protrusion in an optical axis direction.

6. The lens module of claim 5, wherein, when assembling the lens barrel and the lens holder, the fastening blade is movable in the space between the upper fastening protrusion and the lower fastening protrusion in the optical axis and circumferential directions.

7. The lens module of claim 1, wherein the upper fastening protrusion comprises a locking protrusion regulating movement toward an upper side of the fastening blade, and
wherein the lower fastening protrusion comprises a support portion regulating movement toward a lower side of the fastening blade.

8. The lens module of claim 7, wherein a distance between a portion of the upper fastening protrusion disposed on a lower portion of the locking protrusion and the support portion of the lower fastening protrusion in the circumferential direction is shorter than a length of the fastening blade in the circumferential direction.

9. The lens module of claim 7, wherein the support portion comprises a fixing protrusion temporarily fixing the fastening blade,
wherein the fastening blade is configured to be disposed on the fixing protrusion prior to rotation in the direction in which the fastening blade rotates for fastening.

10. The lens module of claim 9, wherein the fixing protrusion is provided as a plurality of fixing protrusions, and the plurality of fixing protrusions are spaced apart from each other.

11. The lens module of claim 9, wherein a groove into which the fixing protrusion is inserted is provided in a bottom surface of the fastening blade.

12. The lens module of claim 1, wherein the fastening blade is formed to extend from a light-shielding band portion protruding from an outer surface of the lens barrel.

13. A lens module comprising:
a lens barrel in which a plurality of lenses are disposed; and
a lens holder to which the lens barrel is coupled,
wherein the lens holder includes an upper fastening protrusion fastening the lens barrel, and a lower fastening protrusion spaced apart from the upper fastening protrusion and forming a space between the upper fastening protrusion,
wherein the lens barrel includes a fastening blade to be inserted into the space between the upper fastening protrusion and the lower fastening protrusion,
wherein the lens barrel is configured to rotate in a direction relative to the lens holder to fasten the fastening blade to the fastening portion and couple the lens barrel to the lens holder,
wherein the lower fastening protrusion includes a stepped portion restricting movement of the fastening blade in a direction opposite to the direction in which the fastening blade is fastened, and
wherein the stepped portion extends towards the upper fastening protrusion.

* * * * *